United States Patent Office.

JOSEPH FRIEDRICH FREIHERR VON MERING, OF HALLE-ON-THE-SAALE, GERMANY.

BENZYL-MORPHIN.

SPECIFICATION forming part of Letters Patent No. 584,388, dated June 15, 1897.

Application filed October 2, 1896. Serial No. 607,697. (No specimens.)

*To all whom it may concern:*

Be it known that I, JOSEPH FRIEDRICH FREIHERR VON MERING, of Halle-on-the-Saale, Germany, have invented certain new and useful Improvements in and Relating to Morphin Derivates; and I do hereby declare the following to be a full, clear, and exact description of the invention, such as will enable others skilled in the art to which it appertains to make and use the same.

My invention relates to a new therapeutic substance, benzyl-morphin, as such and in its salts, and has for its object the production of an antispasmodic or soothing agent, to which end the invention consists in the process of obtaining such substances and in the product.

Morphin derivates of the aromatic alkyls have, up to the present time, been unknown, while other derivates have been manufactured in various ways and their therapeutic properties recognized by medical science.

A large number of experiments were made with morphin-ether with the hope that it might exhibit other properties than morphin or codein and to find, if possible, a less difficult method of preparation, which resulted in the production of a large series of aromatic morphin-ethers. In these experiments I found that benzyl-morphin showed itself as a distinct compound, which on account of its mild yet prompt effects is a valuable addition to the list of compounds of morphin.

Benzyl-morphin is obtained by treating benzyl-halogen with morphin in a proper manner by the addition of alkali and a solvent, as alcohol. The alkali can be used as alkali-alkylate, *e.g.*, sodium-alkylate. The best method of preparation, which gives a nearly theoretical result, is the following. One part morphin is heated in a retort with .23 parts sodium-ethylate, .43 parts benzyl-chlorid, and about .20 parts absolute alcohol until the separation of sodium chlorid. After filtering out the sodium chlorid the benzyl-morphin is obtained from the filtrate by the addition of hydrochloric acid in the form of an almost insoluble chlorid. This is purified by recrystallization from a water solution of the salt.

Benzyl-morphin hydrochlorate forms colorless brilliant little needles, which are soluble with difficulty in alcohol, but easier in water.

The benzyl-morphin itself is obtained by dissolving a salt thereof, produced as above set forth, in a suitable solvent, as water, then adding thereto an alkali in excess—as, for instance, sodium or potassium hydroxid—and separating out the benzyl-morphin by addition to the solution of a solvent of the benzyl-morphin, as chloroform, ether, or the like. The benzyl-morphin set free by the alkali passes over into the solvent, and after shaking some time the whole is allowed to rest, when the two liquids will separate and the solution of benzyl-morphin can be separated by decantation from the alkaline liquor and the solvent removed by evaporation, whereupon the benzyl-morphin crystallizes into large brilliant prisms or tablets. It is but slightly soluble in water, but dissolves readily in alcohol, ether, benzene, and other like solvents. It does not give the characteristic blue color of morphin by the addition of chlorid of iron in neutral solutions. By analysis it gives the following formula:

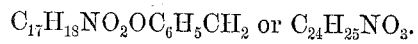
$$C_{17}H_{18}NO_2OC_6H_5CH_2 \text{ or } C_{24}H_{25}NO_3.$$

With most of the organic acids benzyl-morphin forms easily-soluble amorphous salts.

Benzyl-morphin has many advantages over the alkali ethers of morphin, and especially over methyl-morphin, (codein,) which is used in preference to all other alkylic ethers of morphin.

Benzyl-morphin has a more certain effect than codein, notwithstanding its greater molecular weight, and exercises its narcotic and soothing action without causing a state of irritation. It is to be used as a mild narcotic and soothing agent—as, for instance, in cases of cough and bronchial catarrh—and generally is to be used in its salts, preferably the hydrochlorate, which dissolves in one hundred and ten parts of cold water, and is used to advantage in doses varying from 0.01 to 0.03 of a gram.

The following is given as an example: Take thirty kilograms of morphin, seven kilograms of sodium-ethylate, thirteen kilograms of benzyl-chlorid, and five hundred to six hundred kilograms of alcohol and digest in a retort on a water-bath until there is no more separation of sodium chlorid, filter and neutralize with hydrochloric acid, and distil off the greater part of the alcohol and purify the product by crystallization.

Having thus described my invention, what I claim as new therein, and desire to secure by Letters Patent, is—

1. The process, which consists in heating morphin in presence of an alkali, a benzyl-halogen, and a suitable solvent, separating the precipitate formed, neutralizing the same by means of an acid, as hydrochloric acid, and purifying the precipitate resulting from the neutralization, substantially as set forth.

2. The process, which consists in heating morphin in presence of an alkali, a benzyl-halogen and a suitable solvent, separating the precipitate formed from the alkali liquor, neutralizing said precipitate by means of an acid, as hydrochloric acid, dissolving the precipitate resulting from the neutralization; adding to this solution an alkali, whereby the benzyl-morphin is set free, and removing the same from the alkaline liquor by means of a suitable solvent, as ether, substantially as and for the purpose set forth.

3. As a new chemical product, benzyl-morphin, possessing the following formula $$C_{17}H_{18}NO_2OC_6H_5CH_2$$

which crystallizes in large brilliant prisms or tablets but slightly soluble in water, and easily soluble in alcohol, ether, benzene, and similar solvents, substantially as described.

In testimony that I claim the foregoing as my invention I have signed my name in presence of two subscribing witnesses.

JOSEPH FRIEDRICH FREIHERR VON MERING.

Witnesses:
 HENRY HARPER,
 EDWARD WUERTEMBERG.